June 26, 1945.   G. Z. MINTON   2,379,244
GLASS SUPPORTING FRAME
Filed March 2, 1944
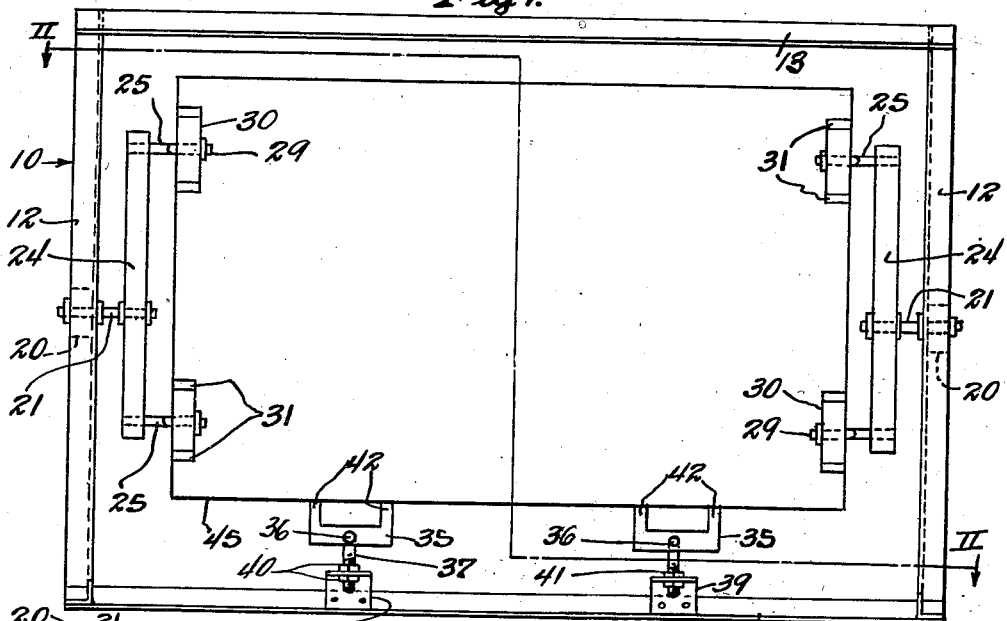
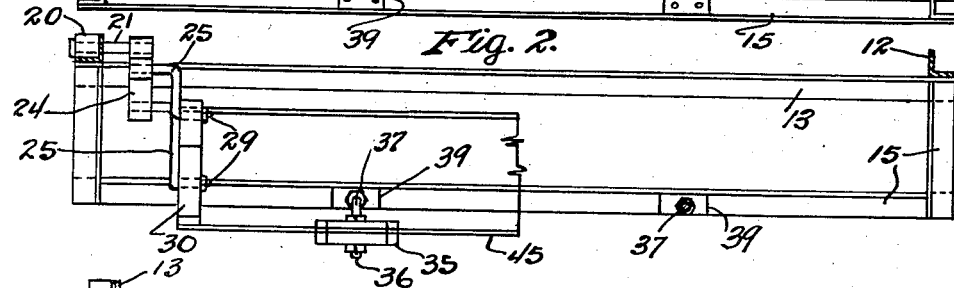
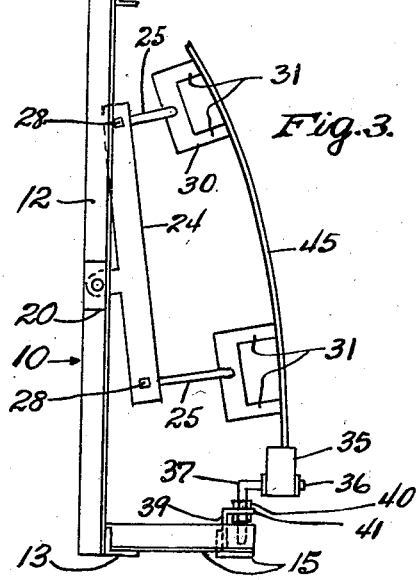
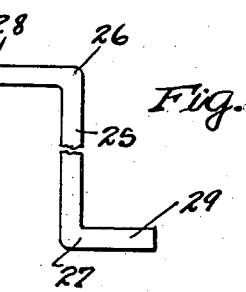
Inventor
GERALD Z. MINTON
By Olen E. Bee
Attorney Patented June 26, 1945

2,379,244

UNITED STATES PATENT OFFICE 2,379,244

GLASS SUPPORTING FRAME

Gerald Z. Minton, Tarentum, Pa., assignor to Pittsburgh Plate Glass Company, Allegheny County, Pa., a corporation of Pennsylvania Application March 2, 1944, Serial No. 524,700

5 Claims. (Cl. 49—45)

This invention relates to supporting frames for glass sheets and it has particular relation to frames adapted to hold sheet glass in an edgewise position.

One object of the invention is to provide an improved arrangement of supporting elements adapted to hold sheet glass in a substantially upright position upon its lower edge to prevent the glass from sagging while being subjected to heat treatment.

Another object of the invention is to provide an improved arrangement of supports of minimum area for holding bent sheet glass in an edgewise position and in which all glass contacting points of the support are flexibly mounted.

In the type of glass supporting frame structure in which tongs are employed for suspending the glass, unsightly dents are impressed by such tongs. Moreover, in moving the glass into or out of furnaces it is difficult to keep the suspended glass from swinging or from being marred by frictionally engaging the supporting elements. In one form of this invention the glass is so supported that tongs or other gripping elements are not necessary. The glass rests upon flexibly mounted elements against which the bent glass leans while the lower glass edge is supported upon other flexibly mounted elements.

In the drawing:

Fig. 1 is a front elevation of a glass supporting frame; Fig. 2 is a horizontal section taken substantially along the line II—II of Fig. 1 and with portions shown in plan; Fig. 3 is an end elevation of the structure shown in Fig. 1; and Fig. 4 is a fragmentary plan of an angular fulcrum support employed in connection with the frame.

In practicing the invention, there is provided an upright frame 10 in which opposite vertical end members 12 are rigidly secured by welding, or the like, to opposite end portions of upper and lower horizontal frame members 13. Base frame members 15 are disposed horizontally and at right angles to the vertical members 12 and are rigidly secured thereto by welding, or the like, to provide a frame base capable of maintaining the frame structure in an upright position while resting upon a floor or other support.

Bearing blocks 20 are mounted by welding, or the like, in the opposite vertical end members 12 in such manner that they rotatably support axially aligned shafts 21, the inner ends of which support rocker arms or levers 24 for pivotal action of the latter about a common horizontal axis. These arms are thus mounted for pivotal movement in parallel vertical planes inwardly of the end members 12.

Opposite end portions of each arm 24 rigidly support rods 25 extending laterally therefrom. Each rod is bent at right angles in opposite directions, as indicated at 26 and 27 (Fig. 4) to form inner and outer offset portions 28 and 29. Each outer rod portion 29 pivotally supports a block 30 centrally of the latter and each block 30 is formed with spaced projections 31 adajacent its opposite extremities.

Lower block supports 35 are pivoted centrally thereof upon horizontal upper arms 36 of upright angular rods 37, which are mounted in angular brackets 39 and are adjustable vertically therein by manipulating nuts 40 threaded on the rods and engaging opposite faces of upper horizontal extensions 41 of the brackets. Upper portions of the blocks are formed with spaced projections 42 disposed at opposite extremities thereof. The brackets 39 are secured to the lower frame member 15 by means of welding or other conventional securing means.

The lower edge of a bent sheet of glass 45 is adapted to rest upon the upper projections 42 of the pivotal blocks 35 which sustain the weight of the glass substantially equally distributed. In view of the pivotal or rocking character of the supports for the lower edge of the glass, strains are prevented along this area. The glass sheet leans from the vertical and its sides adjacent opposite edges rest against the projections 31 of the pivotal blocks 30, which contact the glass under substantially uniform pressure. The several blocks 30 and 35 thus provide a more or less flexible support to the extent that the points of engagement of each block with the glass can conform substantially to the glass surface despite the curved character of the latter. Frames of this type are adapted to be transported into a furnace, such as that described in U. S. Patent 2,032,008, issued February 25, 1936, and the glass mounted in the manner specified above can be heated for annealing, or for other purposes.

Although only one form of the invention has been shown and described in detail, it will be apparent to those skilled in the art that the invention is not so limited, but that various changes can be made therein without departing from the spirit of the invention or the scope of the appended claims.

What I claim is:

1. A glass supporting apparatus comprising a frame having upright and horizontal frame members secured rigidly together, lower supports pivotally mounted along the lower portion of the frame, each support having at least two spaced glass engaging elements to support a lower edge of a glass sheet, upper supports pivotally mounted in horizontally spaced relation upon upright portions of the frame and each upper support having at least two spaced glass engaging elements to receive the glass sheet in leaning relation along the marginal portions of said sheet.

2. A glass supporting apparatus comprising a frame having spaced upright members and spaced upper and lower horizontal members all rigidly secured together, lower blocks each having spaced upwardly facing projections for receiving a lower edge of a glass sheet, means pivotally supporting each block on the lower horizontal frame member, upper blocks each having spaced substantially horizontal facing projections for receiving side portions of the glass sheet thereagainst, and means pivotally supporting the upper blocks on the upright frame members.

3. A glass supporting apparatus comprising a frame having spaced upright members and spaced upper and lower horizontal members all rigidly secured together, lower blocks each having spaced upwardly facing projections for receiving a lower edge of a glass sheet, means pivotally supporting each block on the lower horizontal frame member, a pair of rocker arms pivoted intermediate their ends adjacent opposite extremities of the frame on the spaced upright frame members, each rocker arm having upper blocks pivoted intermediate their ends upon opposite ends of said rocker arms and each upper block having spaced projections engageable with side portions of the glass sheet to aid the lower blocks in supporting the glass in a leaning position.

4. A glass supporting apparatus comprising a frame having spaced upright members and spaced upper and lower horizontal members all rigidly secured together, lower blocks each having spaced upwardly facing projections for receiving a lower edge of a glass sheet, means pivotally supporting each block on the lower horizontal frame member, shafts mounted horizontally and coaxially in opposite upright frame members, rocker arms arranged in upright relation and mounted intermediate their ends in the coaxially aligned shafts, and angular rods rigidly carried upon opposite ends of each rocker arm, an upper block pivoted intermediate its extremities on each rod and having spaced projections engageable with side portions of the glass to aid the lower blocks in supporting the glass in a leaning position.

5. A glass supporting apparatus comprising a frame having spaced upright members and spaced upper and lower horizontal members all rigidly secured together, the lower portion of the frame including a frame base extending substantially horizontally and at right angles to the upright frame members, lower blocks each having spaced upwardly facing projections for receiving a lower edge of a glass sheet, means pivotally supporting each block on the lower horizontal frame base at points spaced outwardly from the plane of the upright members, shafts mounted horizontally and coaxially in opposite upright frame members, rocker arms arranged in upright relation and mounted intermediate their ends in the coaxially aligned shafts, and angular rods rigidly carried upon opposite ends of each rocker arm, an upper block pivoted intermediate its extremities on each rod and having spaced projections engageable with side portions of the glass to aid the lower blocks in supporting the glass in a leaning position.

GERALD Z. MINTON.